Aug. 1, 1939.  A. C. MESSIER  2,167,989
SALVAGE DEVICE
Filed Oct. 5, 1936  7 Sheets-Sheet 2
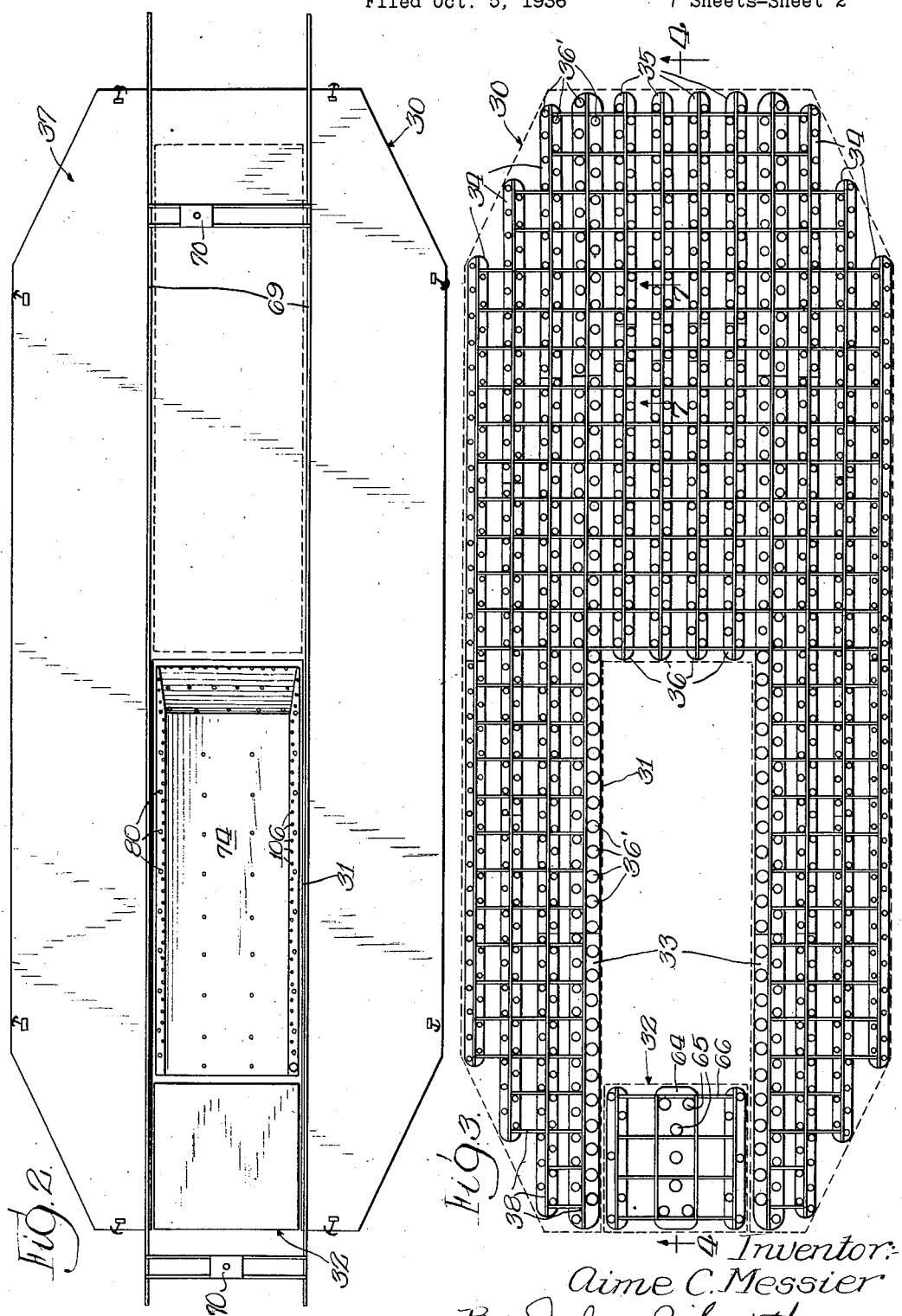
Inventor:
Aime C. Messier
By John P. Smith, atty.

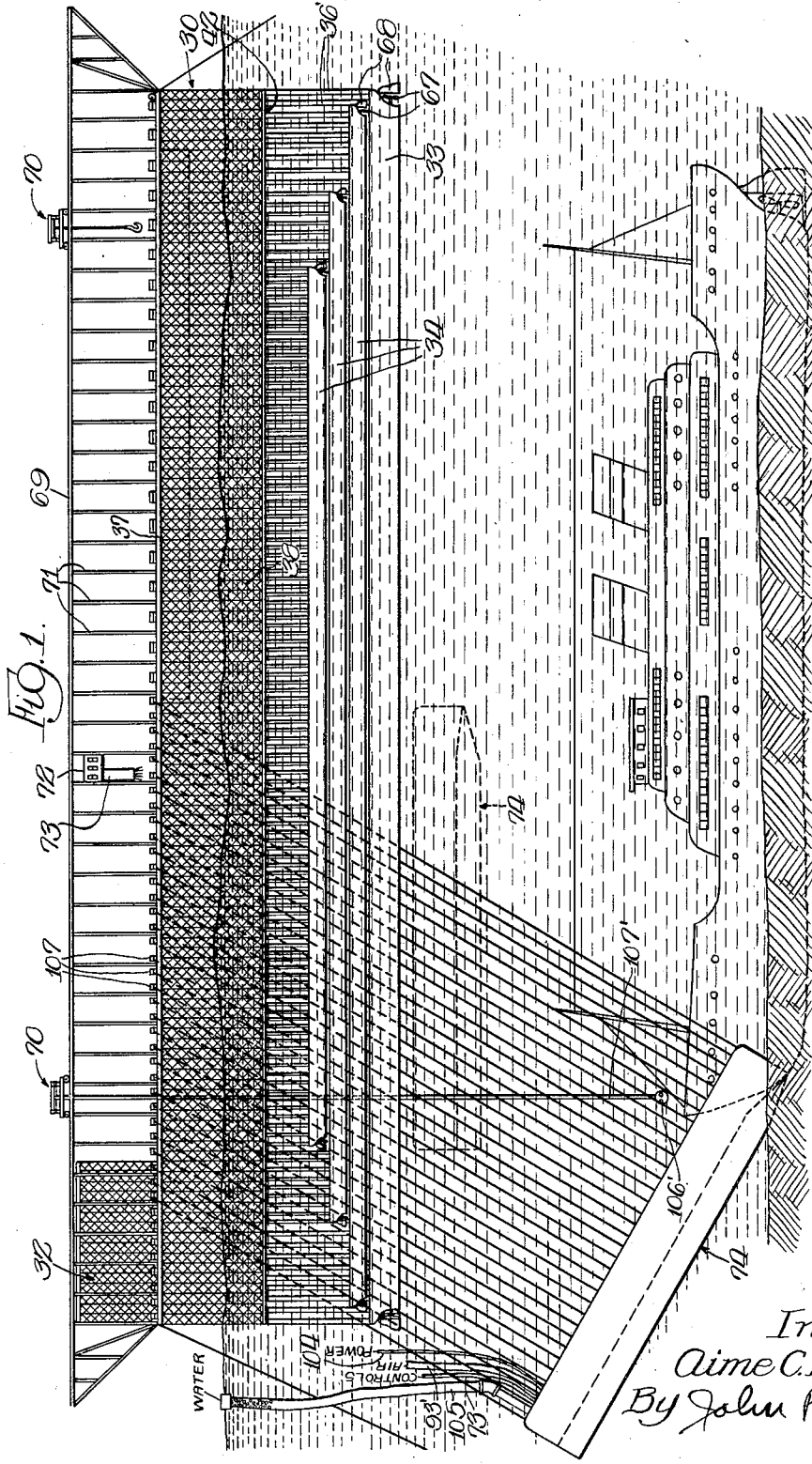

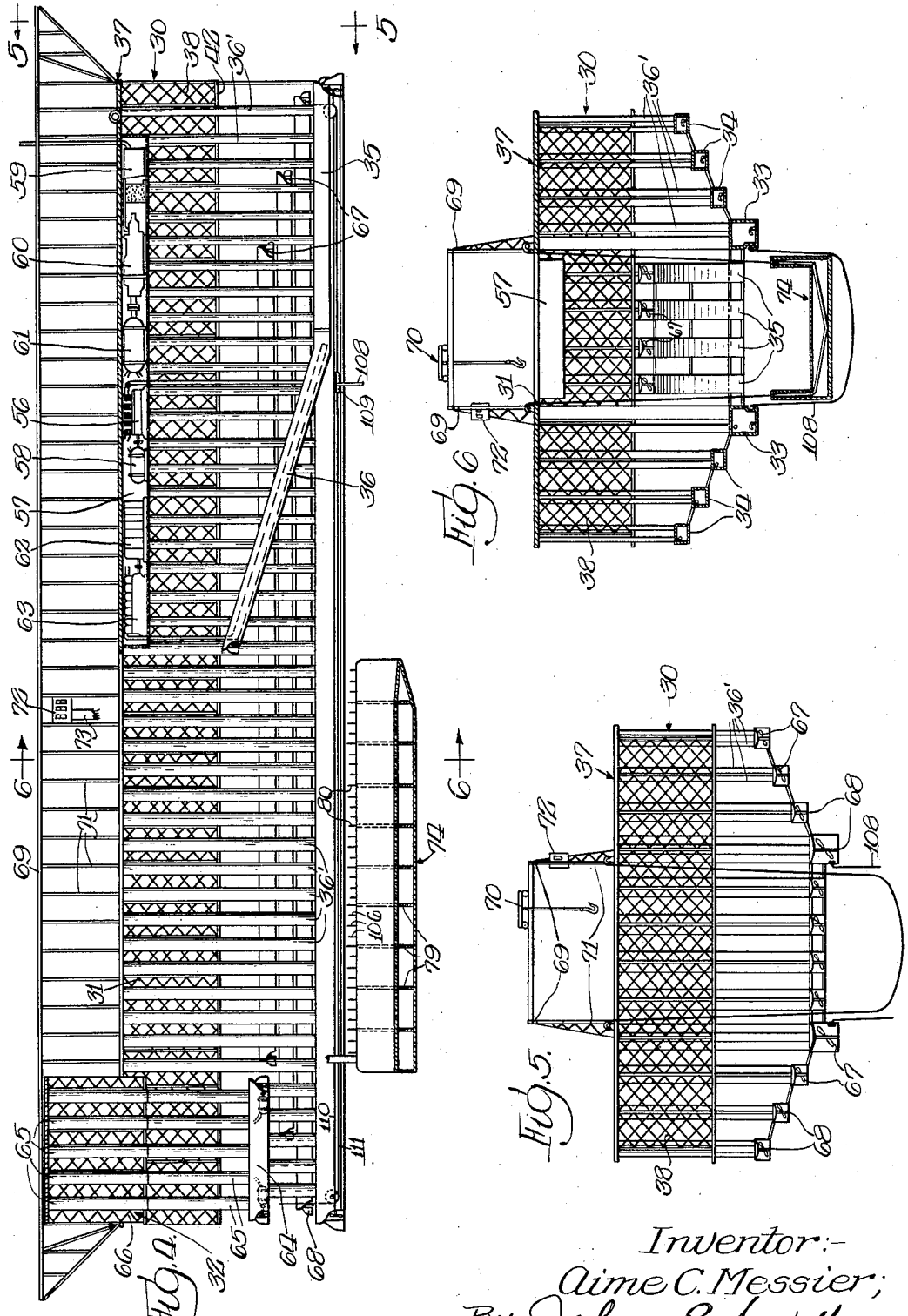

Aug. 1, 1939.  A. C. MESSIER  2,167,989
SALVAGE DEVICE
Filed Oct. 5, 1936  7 Sheets-Sheet 4
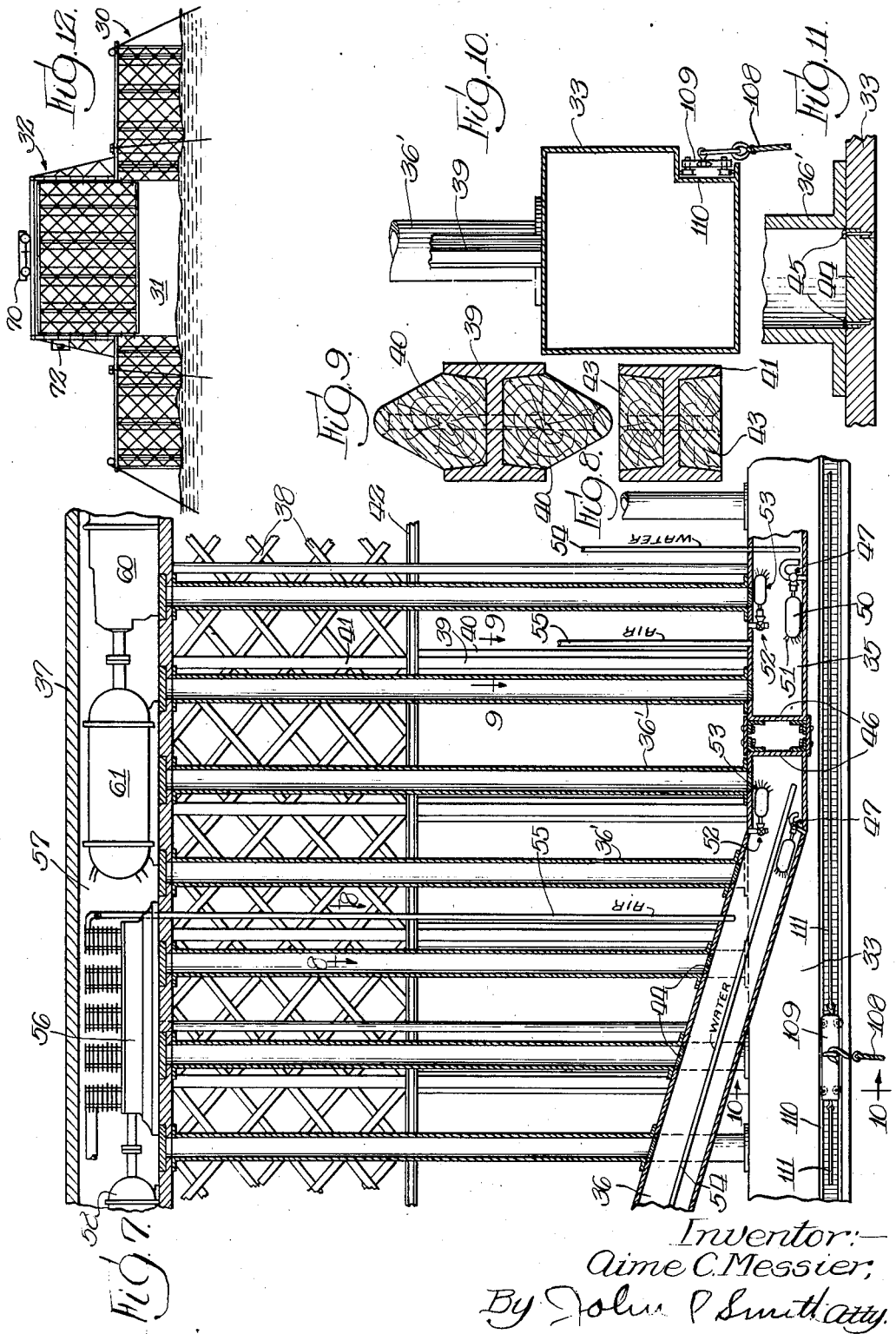
Inventor:—
Aime C. Messier,
By John P Smith atty.

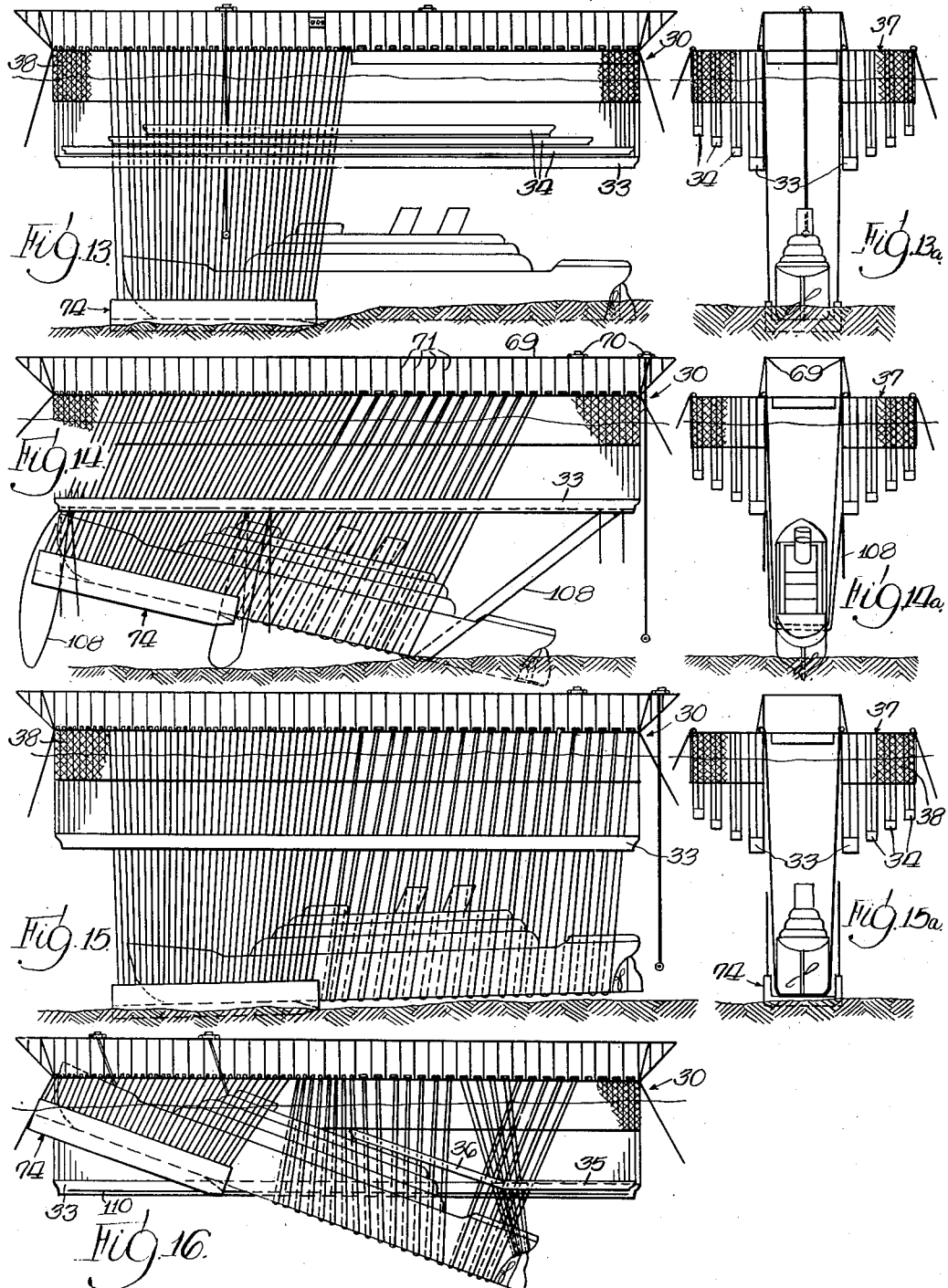

Aug. 1, 1939.  A. C. MESSIER  2,167,989
SALVAGE DEVICE
Filed Oct. 5, 1936  7 Sheets-Sheet 6
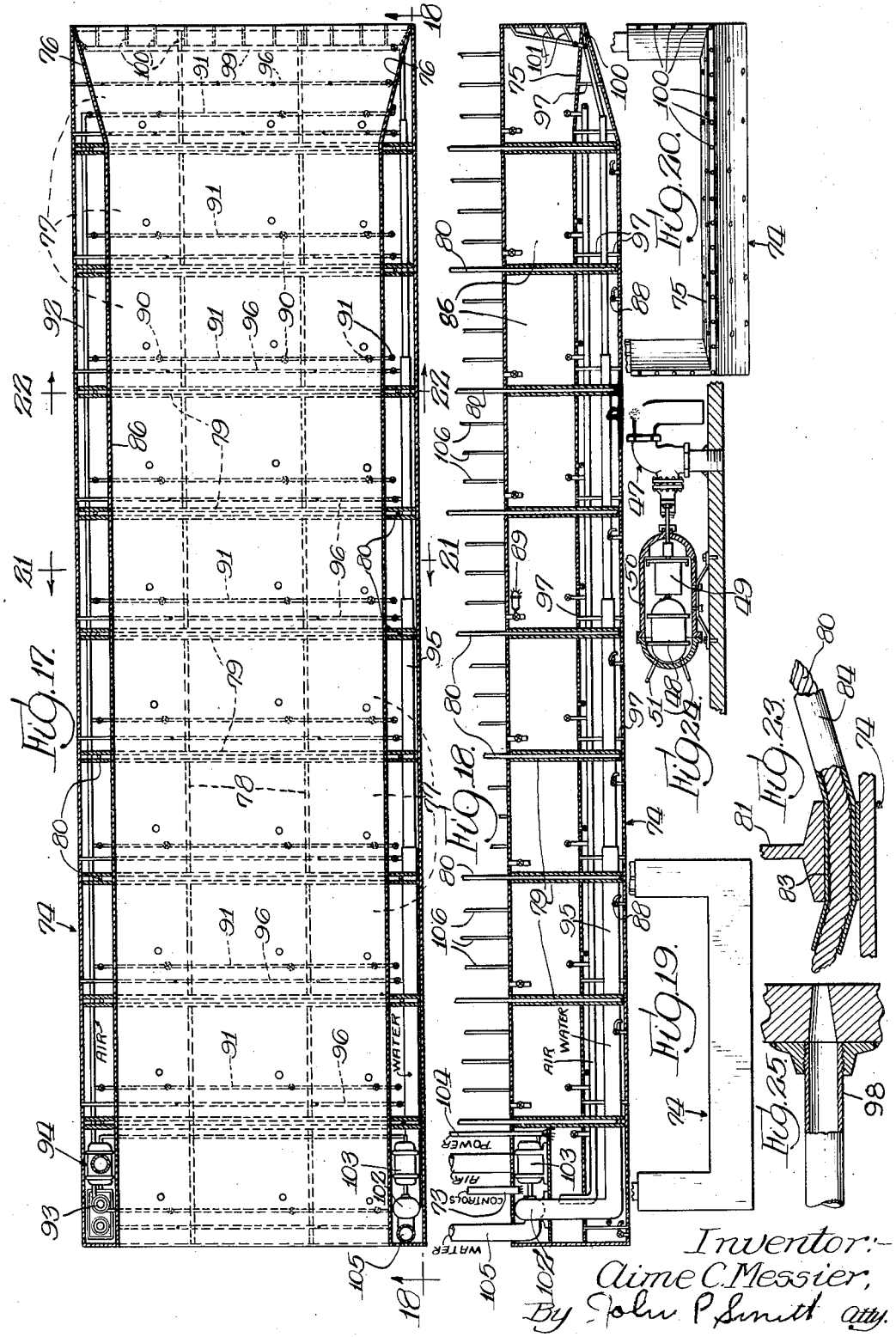
Inventor:—
Aime C. Messier,
By John P. Smith atty.

Aug. 1, 1939.　　　A. C. MESSIER　　　2,167,989
SALVAGE DEVICE
Filed Oct. 5, 1936　　　7 Sheets-Sheet 7
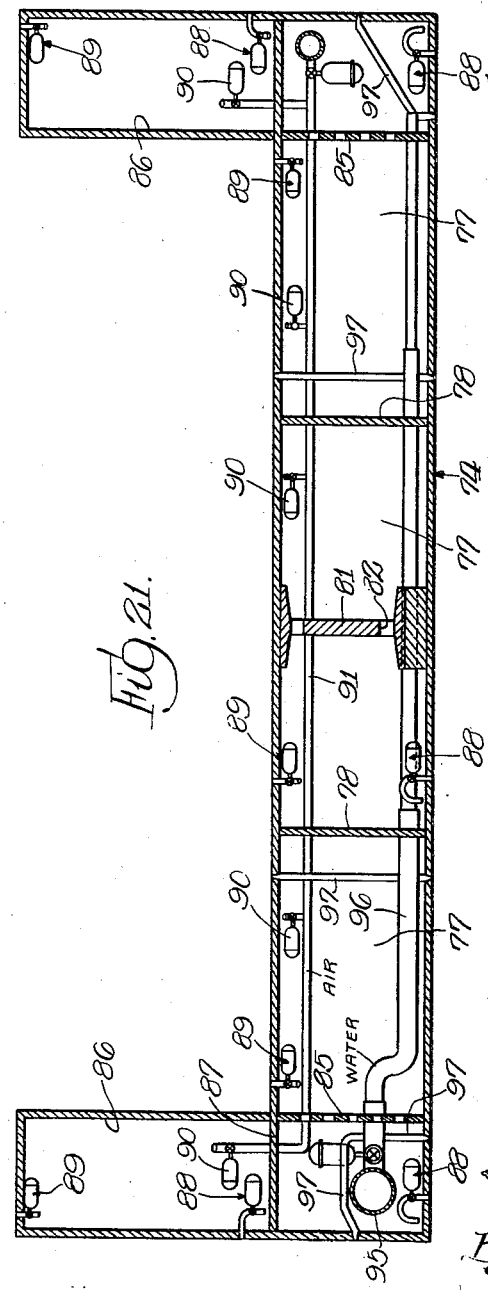

Patented Aug. 1, 1939

2,167,989

UNITED STATES PATENT OFFICE 2,167,989

SALVAGE DEVICE

Aime C. Messier, Chicago, Ill.

Application October 5, 1936, Serial No. 103,961

10 Claims. (Cl. 114—52)

The present invention relates generally to a salvaging device as well as improved apparatus for use in salvaging submerged ships and treasures sunk at sea.

The primary object of the present invention is to provide a novel and improved salvaging apparatus of a powerful rugged construction which is capable of loosening and elevating heavy ocean liners from the bottom of the sea.

Another object of the invention is to provide a novel floating drydock of a construction which will attain substantial buoyancy in rough water.

A further object of the invention is to provide a novel and improved salvaging apparatus in the form of a drydock having controlled compartments so that air or water may be entered into these compartments to secure the proper buoyancy and lifting power for elevating the submerged ship.

A further object of the invention is to provide a novel and improved salvaging device in the form of a floating drydock having a well at one end thereof and a removable section so as to enlarge the well or permit the raised ship to move out on its own power from its supporting drydock when repaired.

A still further object of the invention is to provide a novel and improved construction of a lifting scoop of relatively large dimensions which is adapted to be suspended from the floating dry dock. This scoop is suspended by a plurality of cables extending from each side of the wall. The scoop proper is made up of a plurality of air tight compartments and each compartment is provided with three motor controlled valves operable from the control cab on the dry dock for permitting the entrance of water in these various compartments or for removing the water by air under pressure to increase the lifting power of the scoop.

A still further object of the invention is to provide a novel salvaging device including a suspended scoop having a plurality of compartments therein and an air pump in one of the compartments for supplying air under pressure to all the compartments. This air pump is supplied with air under pressure from a pressure pump on the dry dock.

These and other objects are accomplished by providing a construction and an arrangement of the various parts in the manner hereinafter described and particularly pointed out in the appended claims.

Referring to the drawings:

Fig. 1 is a side elevational view of my improved salvaging device showing diagrammatically one of the steps in the operation of salvaging the ship;

Fig. 2 is a top plan view of the salvaging device shown in Fig. 1;

Fig. 3 is a top plan view of the device showing the top platform removed;

Fig. 4 is a cross sectional view taken on the line 4—4 in Fig. 3;

Fig. 5 is a rear elevational view taken on the line 5—5 in Fig. 4;

Fig. 6 is a cross sectional view taken on the line 6—6 in Fig. 4;

Fig. 7 is an enlarged fragmentary cross sectional view of a longitudinal and vertical cross section of an intermediate portion of the salvaging device;

Fig. 8 is an enlarged cross sectional view taken on the line 8—8 in Fig. 7;

Fig. 9 is an enlarged cross sectional view taken on the line 9—9 in Fig. 7;

Fig. 10 is an enlarged cross sectional view taken on the line 10—10 in Fig. 7;

Fig. 11 is an enlarged cross sectional view of one of the vertical pipes or tubes showing the manner in which they may be sealed with respect to the other compartments of the device;

Fig. 12 is a diagrammatic view in front elevation, showing the manner in which the removable section may be raised and secured to the opposite sides of the floating salvaging device;

Fig. 13 is a side elevational view showing the manner in which the scoop is positioned under one end of the ship to be salvaged;

Fig. 13A is a front elevational view of the position of the device shown in Fig. 13;

Fig. 14 is a side elevational view showing the manner in which one end of the sunken ship is elevated and diagrammatically showing the manner in which additional looped cables are positioned under intermediate portions of the ship being salvaged;

Fig. 14A is a rear elevational view of the device shown in Fig. 14;

Fig. 15 is a side elevational view showing the manner in which the scoop is lowered so that additional cables may be looped under the rear end of the ship being salvaged;

Fig. 15A is a rear elevational view of the position of the ship shown in Fig. 15;

Fig. 16 is a side elevational view showing the manner in which the ship is elevated into the well at the forward end of the salvaging device;

Fig. 17 is a top plan view of my improved form of scoop showing the manner in which it is divided into a plurality of air compartments;

Fig. 18 is a cross sectional view taken on the line 18—18 in Fig. 17;

Fig. 19 is a rear elevational view of the scoop shown in Figs. 17 and 18;

Fig. 20 is a front elevational view of the nose of the scoop;

Fig. 21 is an enlarged cross sectional view taken on the line 21—21 in Fig. 17;

Fig. 22 is a cross sectional view taken on the line 22—22 in Fig. 17 showing the manner in which the cables extend through the tubes between the compartments of the scoop;

Fig. 23 is an enlarged detailed view partly in cross section showing the cable extending through the I-beam in the center of the scoop;

Fig. 24 is an enlarged cross sectional view of one of the valves and its operating mechanism; and Fig. 25 is an enlarged fragmentary cross sectional view showing the construction of the nozzles located in various portions of the scoop.

In illustrating one form of my invention I have shown the same as comprising a pontoon ship or dry dock generally indicated by the reference character 30 which is preferably made up of a plurality of water tight compartments so that the buoyancy or lifting power of the pontoon ship may be controlled by the admission or removal of water from different sections of the ship. Located in the longitudinal center and extending from one end thereof to a point adjacent the center is a recess or well 31. Removably mounted in the forward end of this well is a section, generally indicated by the reference character 32. The pontoon ship in this instance comprises two relatively large longitudinally extending tubular members 33 of substantial square cross section which extends substantially the entire length of the ship. These tubular members 33 form the lower main beam of the floating dry dock and are located on the opposite sides of the longitudinal center at a position vertically below the longitudinal edges of the well 31. Spaced laterally from each of these tubular members 33 and at gradually higher elevations with respect thereto are longitudinally extending tubular members 34 of square cross section. These members 34 are of relatively gradually shorter lengths than the members 33 as clearly shown in Fig. 1 of the drawings and this, together with the tapered formation in Figs. 5 and 6 adds to the buoyancy of the dry dock. Located between the longitudinally extending members 33 at substantially the same elevation are longitudinally extending tubular members 35 of square cross section which extend from the rear end of the ship and have their forward ends inclined upwardly as shown at 36 and terminate at their inner end of the well 31 as clearly shown in Figs. 3, 4 and 7. All of these horizontally extending tubular members 33, 34 and 35 have connected to their upper surfaces so as to communicate therewith vertically extending pipes 36. These pipes or shells 36 are spaced at regular intervals throughout the entire length of the horizontal members and are relatively larger at the points adjacent the longitudinal center of the pontoon and gradually reduced in diameter toward the outer sides. Mounted on and secured to the upper end of all these vertically extending pipes or shells 36 is a horizontal platform or deck generally indicated by the reference character 37. The upper section of the floating dry dock is reinforced and strengthened by a plurality of structural steel cross braces as shown at 38 which extends substantially throughout the longitudinal lengths of the ship as clearly disclosed in Figs. 1, 4, 5, 6 and 7. The ship structure is further reinforced and strengthened by I beams 39 which are located between the vertical pipes 36 throughout the structure. (See Figs. 7 and 9.) These I-beams are reinforced by tapered wood fillers 40 secured to the opposite channels of these I beams 39. The cross steel structural portion 39 is similarly reinforced by I beams 41 located at regular intervals between the pipes 36 and support a supplemental main frame member 42. (See Figs. 7 and 8.) These I-beams 41 are further reinforced by flat wood block fillers 43 secured to the opposite channels of the I-beams. The communication between the longitudinally extending tubular members 33, 34 and 35 and the vertical pipe 36' may be shut off or closed by steel plugs or plates 44 which may be secured in position by bolts 45. (See Figs. 7 and 11.) The longitudinal tubular members 33 are divided into four separate longitudinal compartments while the longitudinal members 34 are arranged so as to have a lesser number of compartments than the next adjacent lower member. The manner in which these horizontal members are separated in compartments is best illustrated in Fig. 7 of the drawings in which one of the members 35 is shown with dividing walls 46 separating the rear compartment from the inclined compartment 35'. Each of these compartments in all these horizontal members, namely, 33, 34 and 35, are provided with a water inlet valve generally indicated by the reference character 47 (shown in detail in Fig. 24 of the drawings). This valve 47 is controlled and operated by a motor 48 which is connected by transmission mechanism 49 to the valve 47. The motor 48 and the transmission 49 are encased in a housing 50. The motor is provided with connecting wires 51 which in turn are extended up to the control cab on the dry dock hereinafter more fully described. In a similar manner each of these compartments are provided with an air outlet valve, generally indicated by the reference character 52 which is actuated and similarly controlled by a motor and transmission within the housing generally indicated by the reference character 53. Each of the compartments are also provided with a water pipe line 54 which extends to a point adjacent the bottom of each of the compartments for withdrawing the water therefrom. Each of the compartments are also provided with air pressure pipes for forcing air into the compartment. These pipes are connected to the air pump, generally indicated by the reference character 56 in the power room compartment 57 located below the main deck 37. The air pressure pump 56 is driven by an electric motor 58. (See Figs. 4 and 7.) Also located in the power room are boilers 59, steam turbines 60, a generator 61, a Diesel engine 62 and water pump 63.

Another novel feature of my improved floating pontoon or dry dock includes a novel removable section which is adapted to be mounted between the forward end of the dry dock and the forward end of the well 31. (See Figs. 2, 3 and 4.) This removable section 32 similarly comprises three spaced apart longitudinally extending tanks 64, which in turn, are structurally braced by structural steel cross braces 66 similar in construction to that of the main floating dry dock. This removable section 32 may be entirely removed from the well 31 so as to accommodate a larger ship being salvaged, or the lower horizontal and vertical tank sections may be removed so that the upper steel structure may be elevated and secured in position shown in Fig. 12 of the drawings to reinforce the forward ends of the floating dry dock when the device is operating in rough sea and still permits the elevation of a relatively larger ship than the size of the well indicates when the removable section is in place. When the section 32 is elevated as shown in Fig. 12 of the drawings, the salvaged ship when repaired may be moved out from the well 31 under the elevated section 32. It will be observed that the surface of the water in the well is comparatively quiet inasmuch as the steel structure and vertical pipes of the dry dock subside the rough waves. The forward and rearward ends of the longitudinally extending tanks 33, 34, 35 and 64 are provided with propellers 67 and rudders 68 so that the dry dock as a whole may be steered and propelled under its own power. Mounted on the top deck 37 and extending longitudinally throughout the length of the dry dock on both sides of the well 31 are travelling crane or derrick rails 69 upon which two travelling cranes generally indicated by the reference character 70 are mounted. As this apparatus is designed to lift extremely heavy loads, it will of course, be understood that the tracks are supported by steel posts and girders 71 which are suitably braced to support the load. Mounted in the approximate center of the dry dock and in elevated position on one side of the derrick structure is a cabin or control room 72. (See Figs. 4, 5 and 6.) From which control cables 73 extend to all operating apparatus in the power room 57 as well as to all the valves, rudders and propellers for controlling the operation of all the apparatus as well as the maneuvering of the dry dock.

Another very important feature of the present invention includes a novel type of scoop which is adapted to be suspended by cables from each side of the well 31 of the dry dock 30. This scoop is arranged in a plurality of air tight compartments into which water may be admitted or discharged therefrom for controlling its position and operation in salvaging a ship from the sea. This scoop is also provided with a plurality of water pressure nozzles which is adapted to discharge water under pressure for removing the mud around one end of the sunken ship and permitting the entrance of the scoop under one end thereof in the manner diagrammatically illustrated in Fig. 1 of the drawings. My improved form of scoop is generally indicated by the reference character 74. (See Figs. 1, 4 and 17 to 22 inclusive.) The scoop 74 is in the form of a relatively large channel-shaped member having a forwardly pointed nose 75 and oppositely disposed forwardly pointed side walls 76. (See Figs. 17 and 18.) The horizontal bottom portion is divided into thirty rectangular prism-like compartments 77 by longitudinally extending vertical walls 78 and transverse dividing walls 79. Between each of the compartments two of each such walls 79 are positioned in relatively close proximity. Between each pair a supporting cable 80 projects. (See Figs. 17, 18, 22 and 23.) Extending longitudinally in the center of the scoop 74 is a relatively heavy I-beam 81 which is provided with upper and lower apertures 82 to permit communication with each side of the center compartment which is divided in two by the beam. The lower flange of the I-beam has an aperture 83 through which a tubular pipe 84 projects and in which the cable 80 is mounted as clearly shown in Figs. 22 and 23 of the drawings. Supplemental apertured walls 85 are located in the outer compartments 77 to reinforce and strengthen the scoop structure. The side walls constituting a scoop are similarly divided into compartments 86 by the top plate 87 of the scoop. Each of these side walls are divided into ten compartments by the transverse walls 79 similar to the compartments 77 forming the bottom of the scoop. These partitions, of course, are braced together or welded by suitable angle members (not shown for the purpose of clearness). Mounted in each of the compartments 77 and 86 of the scoop 74 are water inlet valves, generally indicated by the reference character 88 which are identical in construction with the complete valve structure and operating mechanism as that shown in Fig. 24 of the drawings. Each of these compartments are provided with air outlet valves, generally indicated by the reference character 89 which are substantially identical in construction with the operating mechanism disclosed in Fig. 24 of the drawings. Each of these compartments are provided with air inlet valves 90 which are controlled by a construction similar to that shown in Fig. 24. These air inlet valves 90 communicate with transverse pipes 91 which in turn communicate with a longitudinally extending air pressure pipe 92. The rear end of the pipe is connected to an air pump 93 mounted in one of the rear compartments 86 of the scoop 74. This air pump in the scoop is supplied with air under pressure from the air pump 56 in the power room 57 of the dry dock. This pump 93 is operatively driven by a motor 94 mounted in the same compartment with the pump. The operative controls, of course, for this motor and the respective controls for the valves extend through the control cables 73 to the control cab 72 of the dry dock.

Another very essential feature of the present invention includes a system of nozzles projecting from different portions of the scoop for discharging water under pressure so as to remove the mud embedded round the sunken ship and make room for the positioning of the scoop under one end thereof. This mechanism includes a longitudinally extending pipe 95 which is located in one side of the scoop and extends from the rear end thereof to the nose of the scoop. This pipe is gradually reduced in size as it approaches the forward end of the scoop. Communicating with this pipe 95 at intervals therealong and extending transversely through the compartment are reduced communicating pipes 96. (See Figs. 17, 18 and 21.) Communicating with each of these transversely extending pipes 96 are nozzle connections 97 which extend through the upper and lower walls of the scoop as well as the side walls thereof and assume the form of a nozzle as shown at 98 in Fig. 25 of the drawings. Located in the forward end or nose of the scoop is a transverse pipe 99 which communicates with the forward end of the water pressure pipe 95 as clearly shown in Figs. 17 and 18 of the drawings. Communicating with the pipe 99 are a plurality of nozzles 100. Similarly in the vertically extending pointed portions 76 on the opposite sides of the scoop 74 are a plurality of nozzles 101 which also communicate through a series of pipe lines with the water pressure pipe 95. The rear end of the water pipe 95 is connected to a water pump 102 mounted in one of the rear compartments of the scoop 74. This water pump is driven by a motor 103. The motor 103, of course, is provided with wires and control connections 104 which extend to the control cab 72 on the dry dock. The water is supplied to the pump 102 through a water conduit 105 which has its upper end supported by a float in the manner clearly illustrated in Fig. 1 of the drawings. The scoop as a whole is supported by the cables 80 which extend transversely through the scoop in the manner clearly illustrated in Fig. 22 of the drawings and is additionally supported by intermediate cables 106 which have their lower ends securely fastened to the upper surfaces of the side walls. The upper ends of these cables 80 and 106 are connected to winches 107 located along the longitudinal edges of the well 31 of the dry dock 30. In connection with my improved salvaging device, a submerged observation shell or ball 106' is suspended from a cable 107' supported from one of the travelling cranes 70 to observe and direct by telephone communication the operation and manipulation of the controls for effecting the elevation of the sunken ship, and for locating the definite location of the ship to be removed.

The operation of my improved salvaging device is as follows:

After the location of the sunken ship has been ascertained, the dry dock is maneuvered and anchored in a position where the longitudinal length of the sunken ship extends in a line or plane vertically below the longitudinal center of the dry dock with the forward end of the dry dock a relatively short distance forward of one end of the sunken ship. In this position the dry dock may be anchored by the conventional form of anchors so that the dry dock assumes the position with respect to the sunken ship substantially as shown in Fig. 1 of the drawings. In the first operation the scoop 34 is let vertically downwardly on the supporting cables 80 and 106 by gradually releasing or unwinding the cables from the winches 107. This is accomplished, if necessary, by opening the valves 88 to admit water and opening the valves 89 to release the air so that the compartments 77 and 86 of the scoop may partially or wholly be filled with water in order to add weight and accomplish a vertical sinking of the scoop in rough sea. When this is accomplished the scoop will be angled at substantially thirty degres with the pointed nose of the scoop positioned at one end of the sunken ship and the dry dock maneuvered so that the supporting cables 80 and 106 will assume an inclined position as shown in Fig. 1 of the drawings. When the salvaging apparatus is in the position shown in Fig. 1 of the drawings, the water pump 102 is put into operation and the water pressure from the nozzles 97, 100 and 101 will wash the mud and dirt away from one end of the sunken ship and the scoop will gradually assume the position diagrammatically shown in Figs. 13 and 13A. When in this position one end of the sunken ship may be elevated by the operation of the winches 107 to the position shown in Figs. 14 and 14A after which looped cables 108 are suspended from a trolley 109 located in channel recesses on one side of each of the pontoon hollow members 33. (See Figs. 7, 10 and 14.) These loop carrying trolleys 109 may be longitudinally adjustable of the length of the dry dock by an encircling cable 111.

After a number of these loop cables 108 engage the intermediate portion of the sunken ship, they are drawn rearwardly and fastened to the winches located on the rear half portion of the dry dock in alignment with the winches along the edges of the well in the manner shown in Figs. 14 and 14A, the front end of the sunken ship is then lowered to the position shown in Fig. 15 after which additional loops may be placed around the rear or other end of the ship. When this has been accomplished, all the wniches may be put into operation and the sunken ship gradually raised into the recess or well 31 located in the forward end of the dry dock. It will be noted that by providing the inclined pontoon members 36 a relatively large ship in comparison to the dry dock may be easily elevated through the well 31 by gradually dismounting that portion of the ship as it is raised through the well. If greater space is required in the elevation of the larger sunken ship the removable section 32 may be removed from the forward end of the well affording a larger space, or the same may be elevated and secured in elevated position for reinforcing and strengthening the separated sections of the floating dry dock in rough sea. It will also be noted that in order to effect a greater lifting power of the dry dock after a portion of the sunken ship has been lifted, the sectional arrangement of the floating pontoons permits the removal of the water to afford a greater lifting power at either end of the dry dock. In this connection it will also be noted that when the scoop is positioned below the sunken ship the water therein may be removed so as to increase the lifting power and remove the dead weight occasioned by the water in the scoop.

While in the above specification I have described one embodiment which my invention assumes in practice, it will of course be understood that the same is capable of modification and that modification may be made without departing from the spirit and scope of the invention as expressed in the following claims.

What I claim as my invention and desire to secure by Letters Patent is:

1. A salvaging device comprising a pontoon ship having a well located at one end thereof, a scoop adapted to be positioned under one end of the sunken ship suspended by cables from the opposite sides of said well, and means carried by said pontoon ship for suspending loops of cables beneath the other end of said sunken ship.

2. A salvaging device comprising a pontoon ship having a well located at one end thereof, a scoop suspending by cables from the opposite sides of said well for raising one end of a sunken ship, nozzles mounted in the forward end of said scoop for projecting water under pressure therefrom and means carried by said pontoon ship for lowering a plurality of loops of cables and moving said loops to the outer end of said sunken ship.

3. A salvaging device comprising a pontoon ship having a well at one end thereof, a plurality of cables suspended from the opposite sides of said well, a scoop in the form of a relatively large channel member secured to the lower ends of said cables, said scoop adapted to engage and raise one end of said sunken ship, and means mounted on said pontoon ship for engaging and raising the other end of said sunken ship.

4. A salvaging device comprising a pontoon ship having a well at one end thereof, winches mounted on said ship adjacent the opposite sides of said well, cables suspended from said winches, a scoop having its opposite sides connected to the lower end of said cables, said scoop in the form of a relatively large channel member, the bottom and side walls of said scoop being pointed at their forward ends for engaging and raising one end of a sunken ship, and means mounted on said pontoon ship for engaging and raising the other end of said sunken ship.

5. A salvaging device comprising a pontoon ship, a scoop suspended by cables from said ship, said scoop adapted to lift one end of said sunken ship, and means carried by said pontoon ship for lowering and conveying loops of cables over said scoop and beneath the other end of said sunken ship.

6. A salvaging device comprising a pontoon ship having a well located on one end thereof, a removable section adapted to be secured to said ship at one end of said well, a scoop adapted to be inserted under a sunken ship and suspended by cables from the opposite sides of said well for raising one end of the sunken ship, and means carried by said pontoon ship for suspending loops of cables beneath the other end of said sunken ship.

7. A salvaging device comprising a pontoon ship in the form of a rectangular flat floating dry dock, a well extending from one end thereof to substantially the center of said ship, a plurality of longitudinally extending hollow members extending substantially the full length of said ship and forming the lower structure of said ship, the lowermost of said members being larger in cross section than the other of said members, the smaller members being offset upwardly and outwardly with respect to said larger members, and relatively shorter hollow members extending from the rear of said ship to the inner end of said well.

8. A salvaging device comprising a pontoon ship, a scoop suspended from said ship, cables for supporting said scoop from said ship, winches mounted on said ship and connected to the upper ends of said cables, said scoop divided into a plurality of air tight compartments, an air pump mounted in one of said compartments for supplying air to said compartments, a motor for driving said pump, and a second air pump mounted on said ship and connected to said first named pump for supplying air under pressure thereto.

9. A salvaging device comprising a pontoon ship, a scoop suspended from said ship, said scoop being considerably shorter length than said ship, cables for supporting said scoop from said ship, winches mounted on said ship and connected to the upper ends of said cables, said scoop divided into a plurality of air tight compartments, means for admitting water into said compartments, means for releasing the air from said compartments, means for admitting air into said compartments, an air pressure pump mounted in one of said compartments, and a motor mounted in said last named compartment for driving said pump.

10. A salvaging device comprising a pontoon ship, a scoop suspended by cables from said ship, said scoop adapted to lift one end of a sunken ship, and means carried by said pontoon ship for suspending loops of cables beneath the other end of said sunken ship.

AIME C. MESSIER.